Sept. 29, 1959     A. E. GUNDERSEN     2,906,027

WIDTH GAGES

Filed Feb. 2, 1956

INVENTOR
Arnold E. Gundersen
BY
ATTORNEYS

United States Patent Office 2,906,027
Patented Sept. 29, 1959

2,906,027
WIDTH GAGES

Arnold E. Gundersen, Seymour, Conn., assignor to The Greist Manufacturing Company, New Haven, Conn., a corporation of Connecticut Application February 2, 1956, Serial No. 563,108

3 Claims. (Cl. 33—143)

This invention relates to width gages, and more particularly to a gage for determining the inside measurements or inside diameter of a space between two members or an opening or bore although it may also be employed for measuring the outside dimension of one or more members.

It is contemplated by the present invention to provide a width gage of very simple and economical construction but which will at the same time be accurate and convenient in use. As illustrated, the device comprises a pair of blocks or body members having parallel rods or stems secured to one of the blocks and the other being slidably mounted upon these rods. The blocks carry fingers or jaws adapted to be inserted in the opening to be measured, and means are provided on the movable block to secure it in adjustable position upon the rods so that when the gage has been set in proper position to determine the width of an opening, the jaws may be locked and held in this position until released.

Each of the blocks may be provided with more than one of the measuring fingers or jaws so that they may be adapted to various sizes and shapes of openings and, as shown, these jaw members may be made relatively thin so that in their closest positions the outside surfaces of the jaws will be sufficiently close together so that they may be inserted into a relatively narrow opening. It will be seen, therefore, that with a construction of this kind the device may have a relatively wide range in that it can be used for relatively narrow openings and also for relatively wide or long openings, the dimensions in the latter case being limited only by the length of the rods which join the body members or jaw-carrying members.

It may also be noted that the jaws may be made of different cross-sectional shape so that openings of various shapes may be measured.

One object of the present invention is to provide a width gage of simple and economical construction which will at the same time be accurate in use.

Still another object of the invention is to provide a width gage comprising a pair of body or jaw-carrying members joined by rods or the like which are secured to one of the members and slidably received in openings in the other member whereby the jaws may be readily adjusted, one with respect to the other, accurately and throughout a considerable range.

A still further object of the invention is to provide a width gage of the character described wherein means are provided upon the movable body member to secure it in any adjusted position upon the rods projecting from the other member.

To these and other ends the invention consists in the novel features and combinations of parts to be hereinafter described and claimed.

Figure 1:
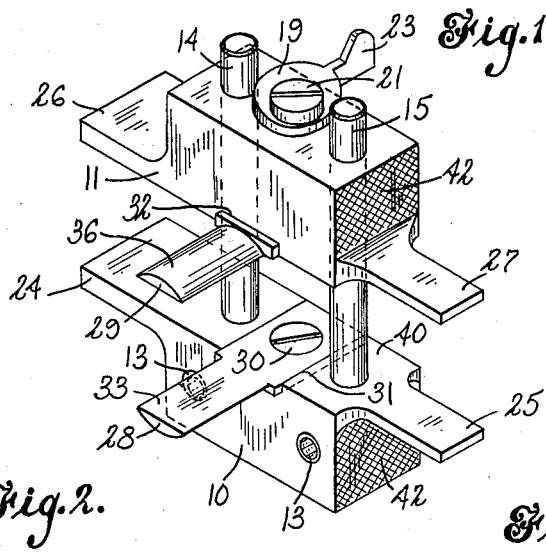
Fig. 1 is a perspective view of a width gage embodying my invention.

To illustrate a preferred embodiment of the invention there is shown in the drawing a width gage comprising a pair of body members 10 and 11 which, as illustrated, comprise rectangular blocks, although the particular shape of these blocks may be varied if desired.

Secured in openings 12 in the member 10 by any suitable means such as set screws 13 are a pair of rods 14 and 15 which project outwardly from the member 10 and are made of a length depending upon the range of adjustment desired for the other or movable body member 11. The rods will be snugly received in the openings 12 so that lateral play will be prevented. They may, of course, be rigidly secured to the block 10 by other means if desired.

The movable body or jaw-carrying member 11 is provided with openings 16 and 17 to snugly but slidably receive the rods 14 and 15 so that the member 11 may be adjusted lengthwise of the rods but maintained in parallel position to the body member 10. The openings 16 and 17 extend through the member 11 so that the rods may project from the outer side thereof in order that the two jaw-carrying members may be adjusted as closely together as possible.

Figure 3:
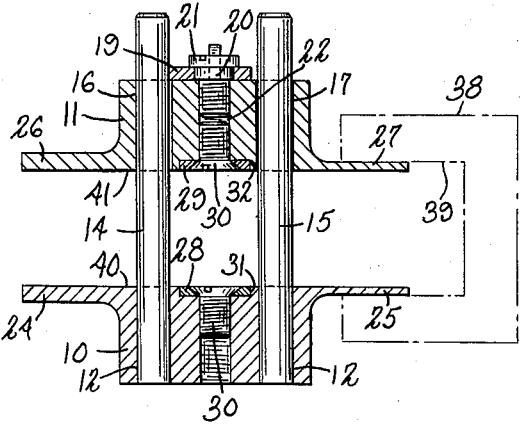
Fig. 3 is a sectional view on line 3—3 of Fig. 2.
Figure 4:
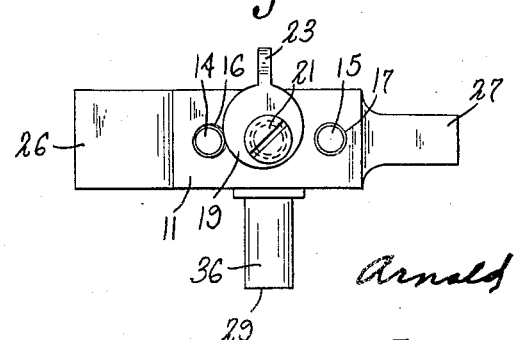
Fig. 4 is a top plan view of the gage.

In order to lock and hold the member 11 in any adjusted position upon the rods 14 and 15 a locking member is provided in the form of a cam 19 rotatably and eccentrically mounted upon the shoulder portion 20 of a screw 21 set into an internally threaded opening 22 in the member 11. The locking cam 19 is provided with a wing portion 23 which may be engaged by the fingers of the user to rotate the cam upon its screw so that its side edge may engage and bind against the rod 14, as shown in Figs. 1 and 3. If desired, the opening 16 in the block 11 which receives the rod 14 may be of slightly larger diameter than the rod 14 by a matter of one or two thousandths of an inch so as to provide for the locking of the body member in place by the cam.

The member 10 is provided with finger or jaw members 24, 25, one projecting from each end edge thereof, and the member 11 is similarly provided with cooperating jaws 26 and 27. It will be noted that the jaws 24 and 26 are of greater thickness than the jaws 25 and 27 so that the latter jaws may be inserted into an opening of narrower width than the jaws 24 and 26. It may also be noted that the body member 11 may be moved through a considerable range of adjustment on the rods 14 and 15, the members being capable of being moved together until their adjacent surfaces are in abutting relation. With such an arrangement the outer surfaces of the members 25 and 27 may be brought closer together for measuring an opening of very narrow width.

Figure 2:
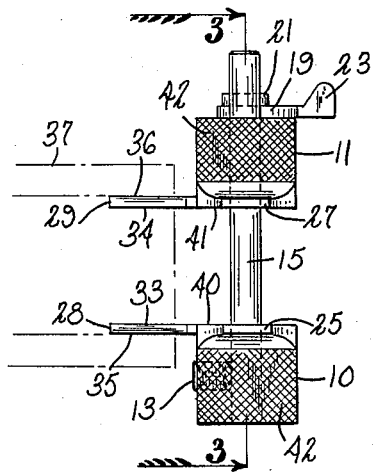
Fig. 2 is an end elevational view thereof.

As illustrated, the jaws 24, 25, 26 and 27 are formed integrally with the body members 10 and 11 and between the rods 14 and 15 are provided additional laterally projecting jaws 28 and 29, these jaws being removably secured to the respective body members by screws 30 and projected from the side edges of the body members. The body members are provided with recesses 31 and 32 in which the rear portions of the jaws 28 and 29 are inserted so that the jaws will be held firmly and securely in place without play. As shown, the jaws 28 and 29 have flat inner or opposing surfaces 33 and 34 but are rounded or of arcuate form upon their outer surfaces, as shown at 35 and 36, so that they may be conveniently employed to measure the inside diameter of a circular hole or bore in a member such as the member 37 shown in dotted lines in Fig. 2.

The rear or base portions of the jaws 28 and 29 which enter the grooves 31 and 32 are preferably rectangular in cross section so as to rest firmly within the grooves.

The use of the device as an inside width gage is shown in Fig. 3 wherein there is shown in dotted lines a part 38 having an inside opening 39, the width of which is desired to be measured. The locking cam 19 may be loosened and the body member 11 moved toward the body member 10 on the rods 14 and 15 until the jaws 25 and 27 are sufficiently close together to enter the opening 39. Thereafter the body member 11 is moved away from the member 10 until the outer surfaces of the jaws 25 and 27 rest against the opposite edges of the opening 39. The locking cam 19 may then be turned by the finger piece 23 to bind against the rod 14 and lock the body 11 in position upon the rods 14 and 15 so that a measurement of the opening 39 may be made by a caliper, micrometer or similar device. It is noted that both inner and outer surfaces of the jaws 24, 25, 26 and 27 are planar in form so that an accurate measurement may be made and so that the tool may be used for both inside and outside measurements if desired.

As shown, the members 10 and 11 have inner faces 40 and 41 of planar form and the inner surfaces of the jaw members lie in substantially the same planes as the inner faces of the respective body members to which they are secured so that the inner faces of the jaw members may be brought flatly together to enable them to occupy a space of relatively small width so as to permit their insertion into a small space. If desired, the outer end faces of the members 10 and 11 may be knurled as shown at 42 for convenience in operation.

While I have shown and described a preferred embodiment of my invention, it will be understood that it is not to be limited to all of the details shown, but is capable of modification and variation within the spirit of the invention and within the scope of the claims.

What I claim is:

1. A gage comprising a pair of body members of substantially identical form, a pair of rods secured to one of said members and projecting in parallel relation therefrom, the other of said members having openings to slidably and snugly receive said rods, each of said body members having a face of planar form disposed toward a similar face upon the other member and having a relatively thin jaw member projecting from each end edge thereof, one face of each of said jaw members being flat and lying in the plane of the inner surface of the respective body member, and releasable means to secure the slidably mounted body member in adjusted positions along said rods, said means comprising a cam member rotatably mounted on the slidably mounted member between said rods and being rotatable about an axis parallel to said rods to position to engage and disengage one of said rods.

2. A gage comprising a pair of body members of substantially identical form, a pair of rods secured to one of said members and projecting in parallel relation therefrom, the other of said members having openings to slidably and snugly receive said rods, each of said body members having a face of planar form disposed toward a similar face upon the other member and having a relatively thin jaw member projecting outwardly from each end edge thereof beyond said rods, one face of each of said jaw members being flat and lying in the plane of the inner surface of the respective body member, releasable means to secure the slidably mounted body member in adjusted positions along said rods, said means comprising a cam member rotatably mounted on the slidably mounted member between said rods and being rotatable to position to engage and disengage one of said rods, and each of said body members having a recess in said face thereof disposed toward that of the other body member and between said rods, and an auxiliary jaw member removably secured in each of said recesses and projecting laterally beyond the body member at substantially right angles to said first-named jaw members, said auxiliary jaw members being in opposed spaced relation to each other and their opposing faces lying respectively in the planes of the opposing faces of the body members to which they are attached.

3. A gage comprising a pair of body members of substantially identical form, a pair of rods secured to one of said members and projecting in parallel relation therefrom, the other of said members having openings to slidably and snugly receive said rods, each of said body members having a face of planar form disposed toward a similar face upon the other member and having a relatively thin jaw member projecting outwardly from each end edge thereof beyond said rods, one face of each of said jaw members being flat and lying in the plane of the inner surface of the respective body member, releasable means to secure the slidably mounted body member in adjusted positions along said rods, said means comprising a cam member rotatably mounted on the slidably mounted member between said rods and upon a pivot parallel to the rods and being rotatable to position to engage and disengage one of said rods, and each of said body members having a recess in said face thereof disposed toward that of the other body member and between said rods, an auxiliary jaw member removably secured in each of said recesses and projecting laterally beyond the body member at substantially right angles to said first-named jaw members, said auxiliary jaw members being in opposed spaced relation to each other, and said auxiliary jaw members being mounted on their outer surfaces and substantially flat on their opposing surfaces and their opposing surfaces lying respectively in the planes of the opposing surfaces of the body members to which they are secured.

References Cited in the file of this patent

UNITED STATES PATENTS

| 364,913 | Emery | June 14, 1887 |
| 382,348 | Billings | May 8, 1888 |
| 892,780 | Vaughn | July 7, 1908 |
| 1,379,116 | Malloy | May 24, 1921 |
| 1,425,027 | Lustrik | Aug. 8, 1922 |
| 1,436,181 | Locke | Nov. 21, 1922 |
| 2,402,715 | Warner | June 25, 1946 |
| 2,414,281 | Trimner | Jan. 14, 1947 |
| 2,588,658 | Plotnik | Mar. 11, 1952 |

FOREIGN PATENTS

| 7,454 | Great Britain | Feb. 19, 1903 |
| 440,723 | France | May 10, 1912 |